(12) United States Patent
Heuvelman

(10) Patent No.: US 9,944,214 B2
(45) Date of Patent: Apr. 17, 2018

(54) CONTRACTOR VEHICLE

(75) Inventor: Dale M. Heuvelman, Fenton, MO (US)

(73) Assignee: DHSquared Innovations, LLC, St. Louis, MO (US)

( * ) Notice: Subject to any disclaimer, the term of this patent is extended or adjusted under 35 U.S.C. 154(b) by 1016 days.

(21) Appl. No.: 13/441,619

(22) Filed: Apr. 6, 2012

(65) Prior Publication Data

US 2012/0248807 A1 Oct. 4, 2012

Related U.S. Application Data

(63) Continuation of application No. 12/164,833, filed on Jun. 30, 2008, now Pat. No. 8,162,371.

(60) Provisional application No. 60/937,718, filed on Jun. 29, 2007.

(51) Int. Cl.
*B60P 3/00* (2006.01)
*B60P 3/14* (2006.01)

(52) U.S. Cl.
CPC ...................................... *B60P 3/14* (2013.01)

(58) Field of Classification Search
CPC ........................................................ B60P 3/14
USPC ...... 296/3, 10, 24.3, 24.32, 24.4, 37.1, 37.6, 296/182.1; 410/30, 32; 182/127
See application file for complete search history.

(56) References Cited

U.S. PATENT DOCUMENTS

| | | |
|---|---|---|
| 4,277,095 A | 7/1981 | Barruw |
| 4,469,364 A | 9/1984 | Rafi-Zadeh |
| 4,705,315 A | 11/1987 | Cherry |
| 4,789,185 A | 12/1988 | Föhl |
| 5,172,952 A | 12/1992 | Lasnetski |
| 5,772,271 A | 6/1998 | Sanders |
| 6,007,129 A | 12/1999 | Kearney, Jr. |
| 6,189,945 B1 | 2/2001 | Rockett |
| 6,523,877 B1 | 2/2003 | Damian |
| 6,644,712 B1 | 11/2003 | Rafi-Zadeh |
| 7,083,045 B2 | 8/2006 | Scott |
| 7,309,093 B2 * | 12/2007 | Ward ........................... 296/37.6 |
| 2004/0188177 A1 | 9/2004 | Scott |
| 2006/0226671 A1 | 10/2006 | Thole et al. |

OTHER PUBLICATIONS

USPTO, Office Action dated Apr. 29, 2010 from U.S. Appl. No. 12/164,833, 13 pages.
USPTO, Office Action dated Jan. 25, 2011 from U.S. Appl. No. 12/164,833, 9 pages.

* cited by examiner

*Primary Examiner* — D Glenn Dayoan
*Assistant Examiner* — Melissa A Black
(74) *Attorney, Agent, or Firm* — Senniger Powers LLP

(57) ABSTRACT

A vehicle having a chassis, a cab mounted on the chassis, and a body. The body includes a bottom, a top and sides. The sides partially enclose an interior space and define an opening for accessing the interior space. The vehicle also includes a closure moveable between an open position and a closed position and a ladder compartment positioned in the interior space adapted for receiving a ladder having a length of at least about 12 feet. The ladder compartment has a lower surface positioned at a level no more than about 42 inches above ground level. The ladder compartment has an open end facing generally toward the opening. The storage compartment is configured so a ladder can slide longitudinally into and out of the ladder compartment through the open end of the ladder compartment.

3 Claims, 5 Drawing Sheets

CONTRACTOR VEHICLE

RELATED APPLICATION

This application claims priority to U.S. Non-Provisional patent application Ser. No. 12/164,833, filed Jun. 30, 2008 and U.S. Provisional Patent Application Ser. No. 60/937,718, filed Jun. 29, 2007, and entitled "CONTRACTOR VEHICLE", the contents of which are each hereby incorporated by reference.

BACKGROUND

The present invention relates to contractor vehicles and more particularly to a vehicle body for carrying equipment and materials used by contractors.

Vehicles used by contractors or workers such as plumbers and garage door installers frequently include trucks or trailers having racks mounted on top. Loading ladders and/or materials on top of the vehicles ladder rack is a source of injury. Not only must workers lift large and/or heavy items above their head to load them on the vehicle rack, but the ladders and materials also are susceptible to falling off the rack during transport, potentially causing injury to persons in other vehicles. When a worker loads and unloads ladders and/or materials from the ladder rack, they must lift the large and/or heavy items above their head, potentially straining their backs. Further, the workers may lose control of the load, damaging property or injuring themselves. In some cases, ladders must be used to position the items on the rack, presenting a potential for the worker to fall off the ladder while loading or unloading the items from the ladder rack. In addition, items stored on the rack are susceptible to weather damage and theft. Moreover, the racks do not provide a storage system in which different types and lengths of materials can be sorted.

Thus, there is a need for a worker vehicle in which ladders and materials need not be lifted overhead to load and unload. Further, there is a need for a vehicle that securely manages the ladders and/or materials to prevent theft, loss, and damage due to weather. Lastly, there is a need for a material inventory control system that permits workers to sort differing materials and different likes of similar materials.

BRIEF SUMMARY

In some embodiments, the present invention relates to a vehicle comprising a chassis, a cab mounted on the chassis, and a body mounted behind the cab. The body comprises a bottom, a top opposite the bottom, and sides extending between the top and bottom. The sides partially enclose an interior space and define an opening for accessing the interior space. The body also comprises a closure moveable between an open position in which the interior space may be accessed through the opening, and a closed position in which the closure limits access to the interior space. Further, the body includes a ladder compartment positioned in the interior space adapted for receiving a ladder having a length of at least about 12 feet. The ladder compartment has a lower surface positioned at a level no more than about 42 inches above ground level. The ladder compartment has an open end facing generally toward the opening. The storage compartment is configured so a ladder can slide longitudinally into and out of the ladder compartment through the open end of the ladder compartment.

In another embodiment, the present invention relates to a vehicle comprising a chassis, a cab mounted on the chassis, and a body mounted behind the cab. The body comprises a bottom, a top opposite the bottom, and sides extending between the top and bottom. The sides partially enclose an interior space and define an opening for accessing the interior space. In addition, the body includes a closure moveable between an open position in which the interior space may be accessed through the opening, and a closed position in which the closure limits access to the interior space. The body also comprises a ladder compartment positioned in the interior space adapted for receiving a ladder having a length of at least about 12 feet. The ladder compartment has a lower surface positioned at the bottom of the body. The ladder compartment has an open end facing generally toward the opening. The storage compartment is configured so a ladder can slide longitudinally into and out of the ladder compartment through the open end of the ladder compartment.

In yet another aspect, the present invention relates to a method of organizing a vehicle having a cab mounted on a chassis, and a body mounted behind the cab. The method comprises positioning a ladder in a ladder compartment in the body of the vehicle, sorting materials by type into storage bins in the body of the vehicle, and sorting materials by size into storage compartments in the body of the vehicle.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
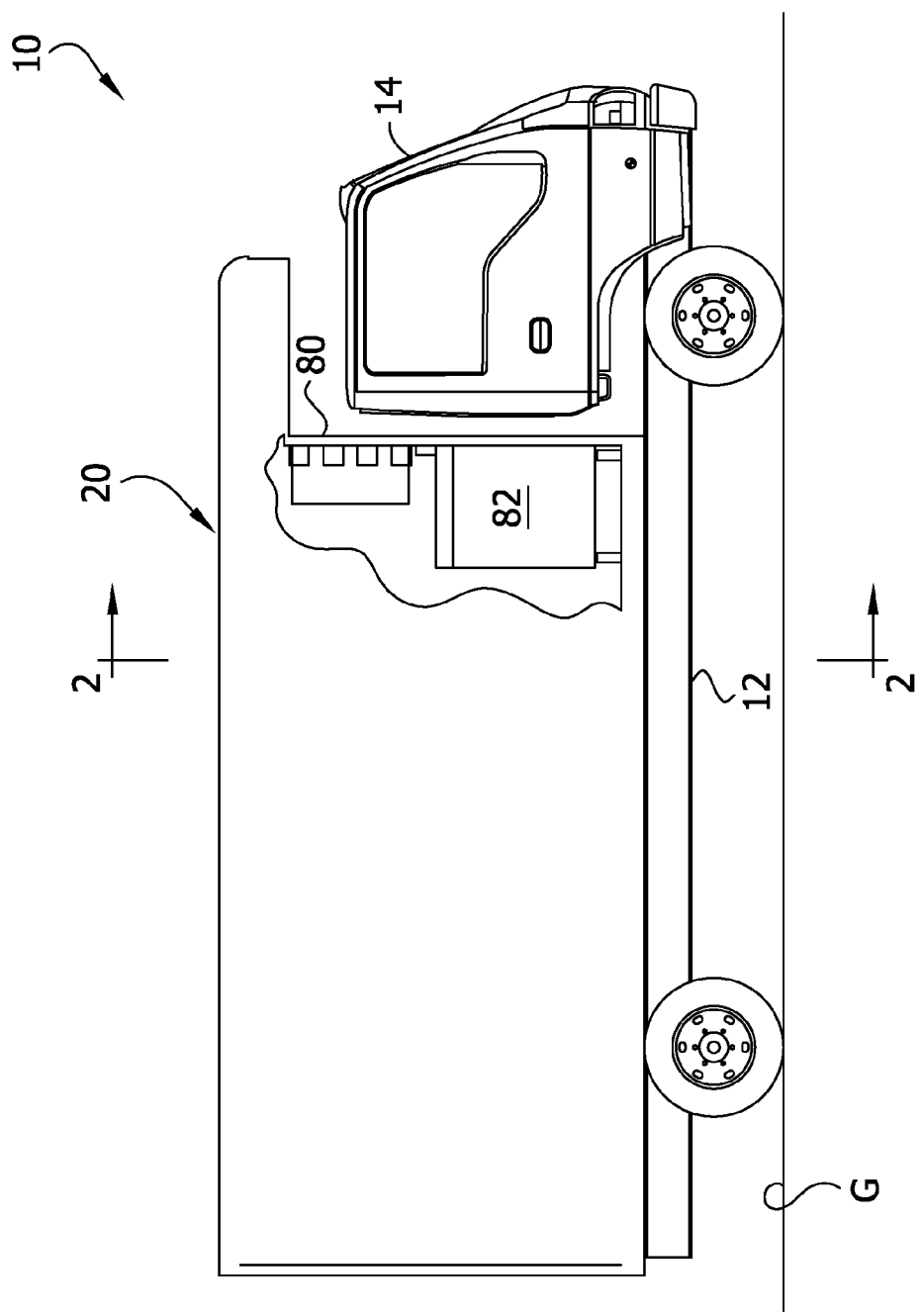
FIG. 1 is a side elevation of a vehicle of the present invention in partial section.

Referring now to the drawings and in particular FIG. 1, a worker vehicle is designated in its entirety by the reference number 10. The vehicle 10 includes a chassis 12, a cab 14 mounted on the chassis, and a body, generally designated by 20, mounted on the chassis behind the cab. As the vehicle 10 is conventional in all respects other than the body, the conventional vehicle features will not be described in further detail.

Figure 2:
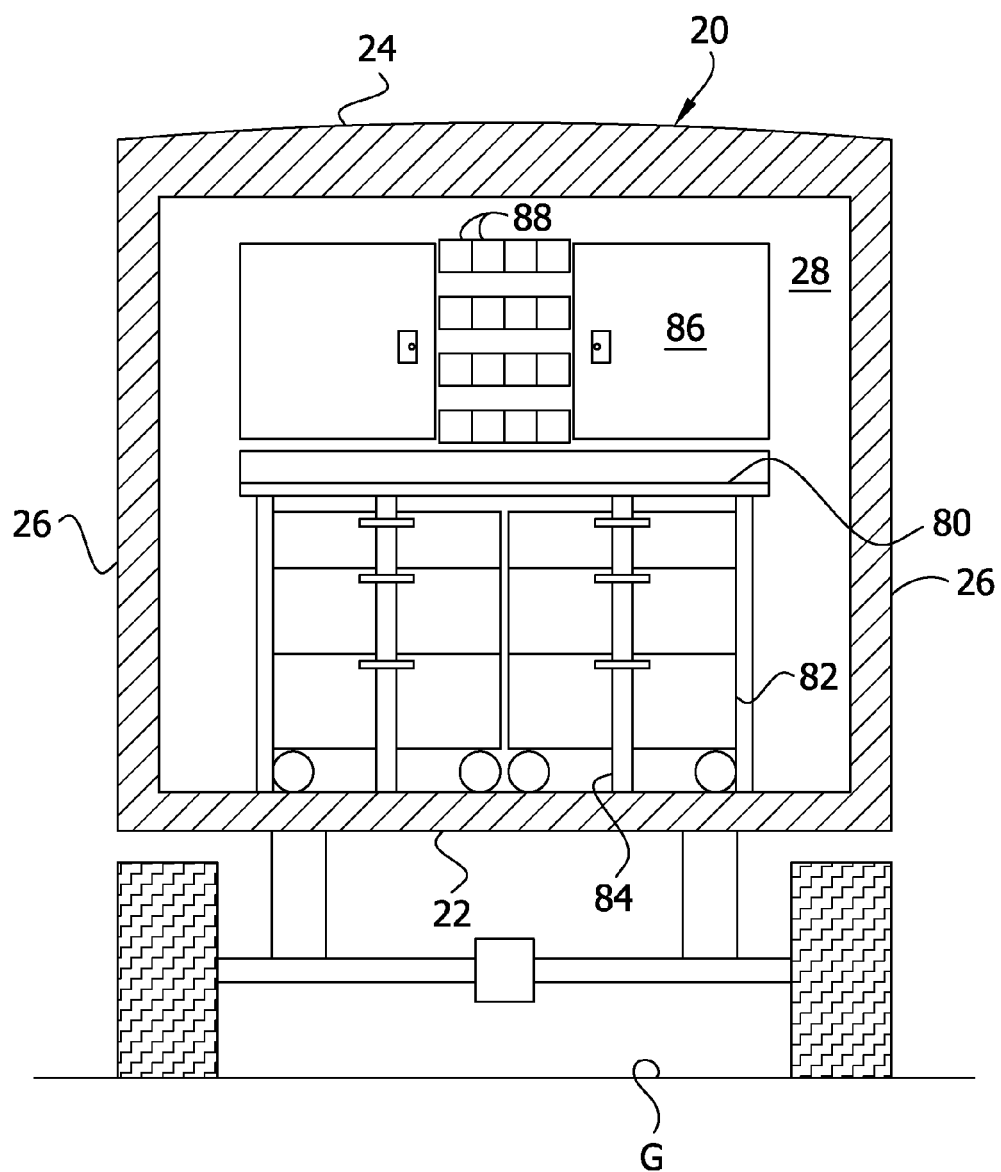
FIG. 2 is cross section of the vehicle taken along line 2-2 of FIG. 1.
Figure 3:
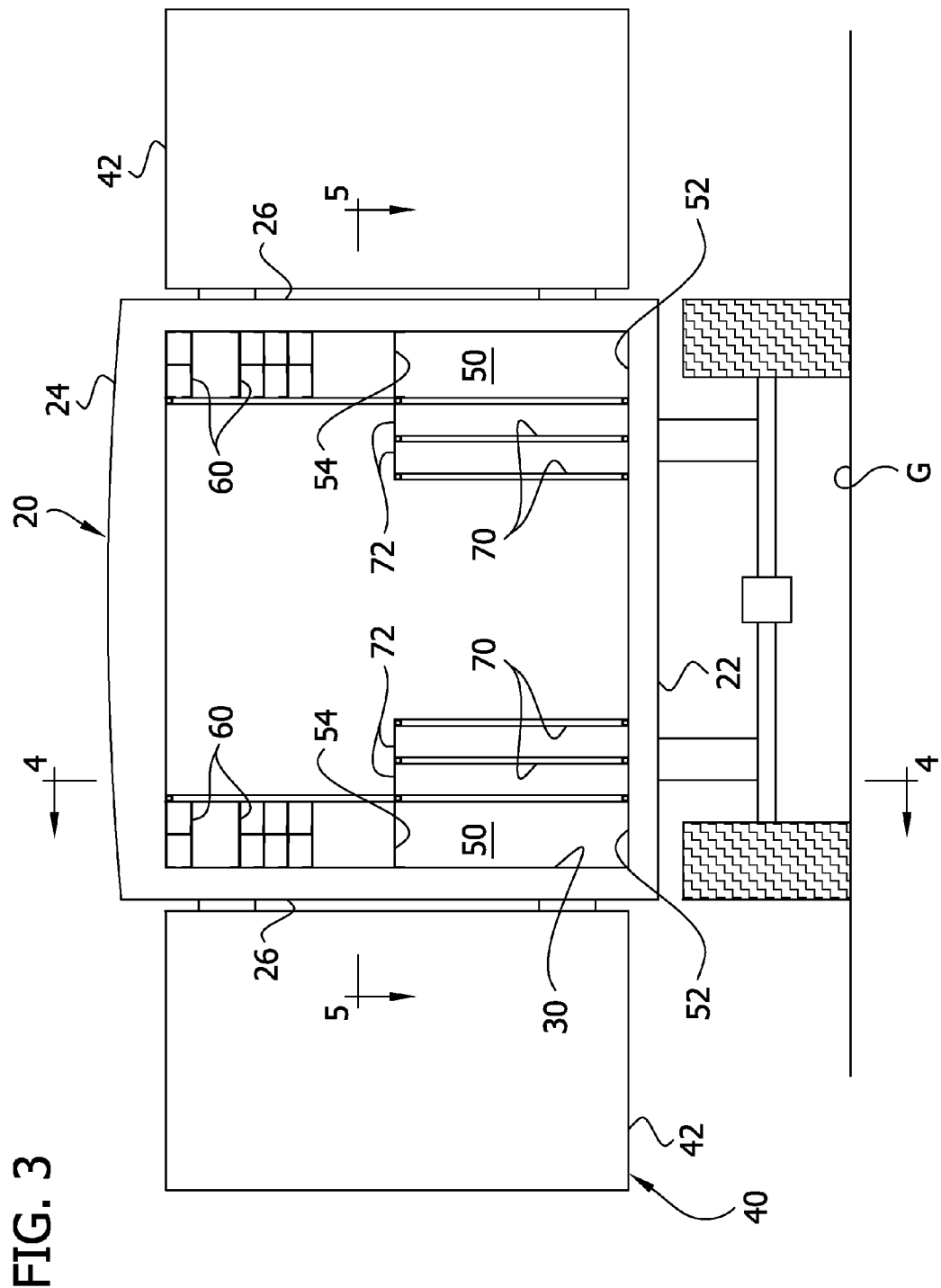
FIG. 3 is rear elevation of the vehicle.

As shown in FIG. 2, the body 20 includes a bottom 22, a top 24 opposite the bottom, and sides 26 extending between the top and bottom. The sides 26 partially enclose an interior space 28. As shown in FIG. 3, the sides 26 also define an opening 30 for accessing the interior space 28 of the body 20. As the bottom 22, top 24 and sides 26 are of conventional construction and made from conventional materials, they will not be described in further detail.

A conventional closure, generally designated by 40, is mounted adjacent the body opening 30. In one embodiment, the closure 40 comprises the posing doors 42 pivotally mounted to the sides 26 adjacent the opening 30. The doors 42 are movable between an open position as shown in FIG. 3 in which the interior space 28 may be accessed through the opening, and a closed position in which the doors are shut to limit access to the interior space. Other closure systems are also envisioned. For example, in some embodiments the closure may include a lift gate (not shown), or a roll up door (not shown). As these closures, their method of manufacture and materials from which they are made are conventional, they will not be described in further detail.

Figure 4:
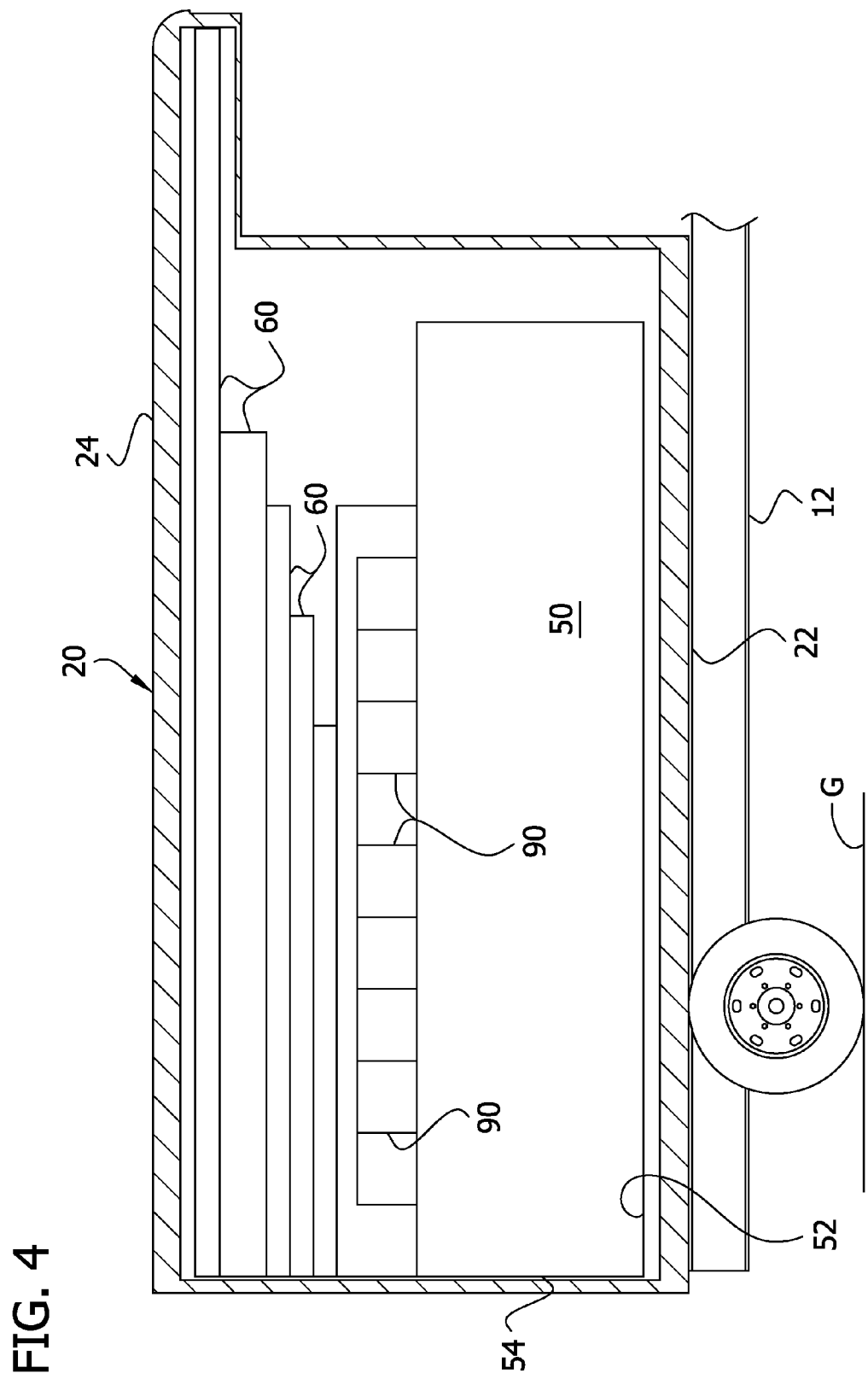
FIG. 4 is cross section of the vehicle taken along line 4-4 of FIG. 3.

As shown in FIG. 3, a ladder compartment 50 is positioned in the interior space 28 of the body 20. The ladder compartment 50 is sized and shaped for receiving a ladder (not shown) having a length of about 12 feet. The ladder compartment 50 in this embodiment has a height that is greater than its width. Although the ladder compartment 50 may have other dimensions without departing from the scope of the present invention, in one embodiment the ladder compartment is about 37 inches tall, about 10½ inches wide and about 13 feet long. The ladder compartment 50 has a lower surface 52 positioned at a level no more than 42 inches above ground level G. Further, the lower surface 52 of the ladder compartment 50 is positioned at or adjacent the bottom 22 of the body 20. The ladder compartment 50 has an open end 54 facing generally toward the opening 30 of the body 20. The ladder compartment 50 is configured so that a ladder can slide longitudinally into and out of the ladder compartment through the open end 54 of the compartment. In some embodiments, the interior space 28 of the body 20 includes two ladder compartments as shown in FIG. 3. Each of the ladder compartments has an open end 54 facing generally toward the opening 30 of the body 20. Further, each ladder compartment 50 has a longitudinal access as shown in FIG. 4 extending from the open end 54 generally away from the opening 30 of the body. As will be appreciated by those skilled in the art, ladder compartments 50 positioned in the vehicle body 20 adjacent the bottom 22 and/or less than about 42 inches above ground level G can help a worker to load and unload a ladder without using a ladder. In one embodiment, the ladder compartments are less than about 34 inches above ground level. Further, the worker does not need to lift the ladder above his head when loading and unloading, but may support the ladder at a more comfortable height such as waist height. Although the ladder compartments 50 in the embodiment shown in the drawings are empty, it is understood that the invention includes embodiments in which one or both compartments contain a ladder.

In addition to the ladder compartments 50, the vehicle body 20 has a plurality of tubes or elongate storage compartments 60 having different lengths as shown in FIG. 4. The differing length storage compartments 60 are particularly convenient for storing stock materials having different lengths. Thus, when a worker cuts stock material to length, the excess may be stored in an appropriately shorter storage compartment 60 where it can easily be identified for future needs. As shown in FIGS. 3 and 4, the elongate storage compartments 60 are positioned generally above the ladder compartment 50 in the interior space 28 of the body. Although the elongate storage compartments 60 may have other dimensions without departing from the scope of the present invention, in one embodiment some compartments are about 3¾ inches high and about 5¼ inches wide and other compartments are about 7⅝ inches high and about 10½ inches wide. Further, the compartments 60 have lengths of about 7¼ feet, about 9 feet, about 10½ feet, about 11½ and about 17 feet. Although there may be other quantities of elongate storage compartments 60 without departing from the scope of the present invention, in one embodiment there are a total of 18 elongate storage compartments arranged as shown in FIGS. 3 and 4.

Figure 5:
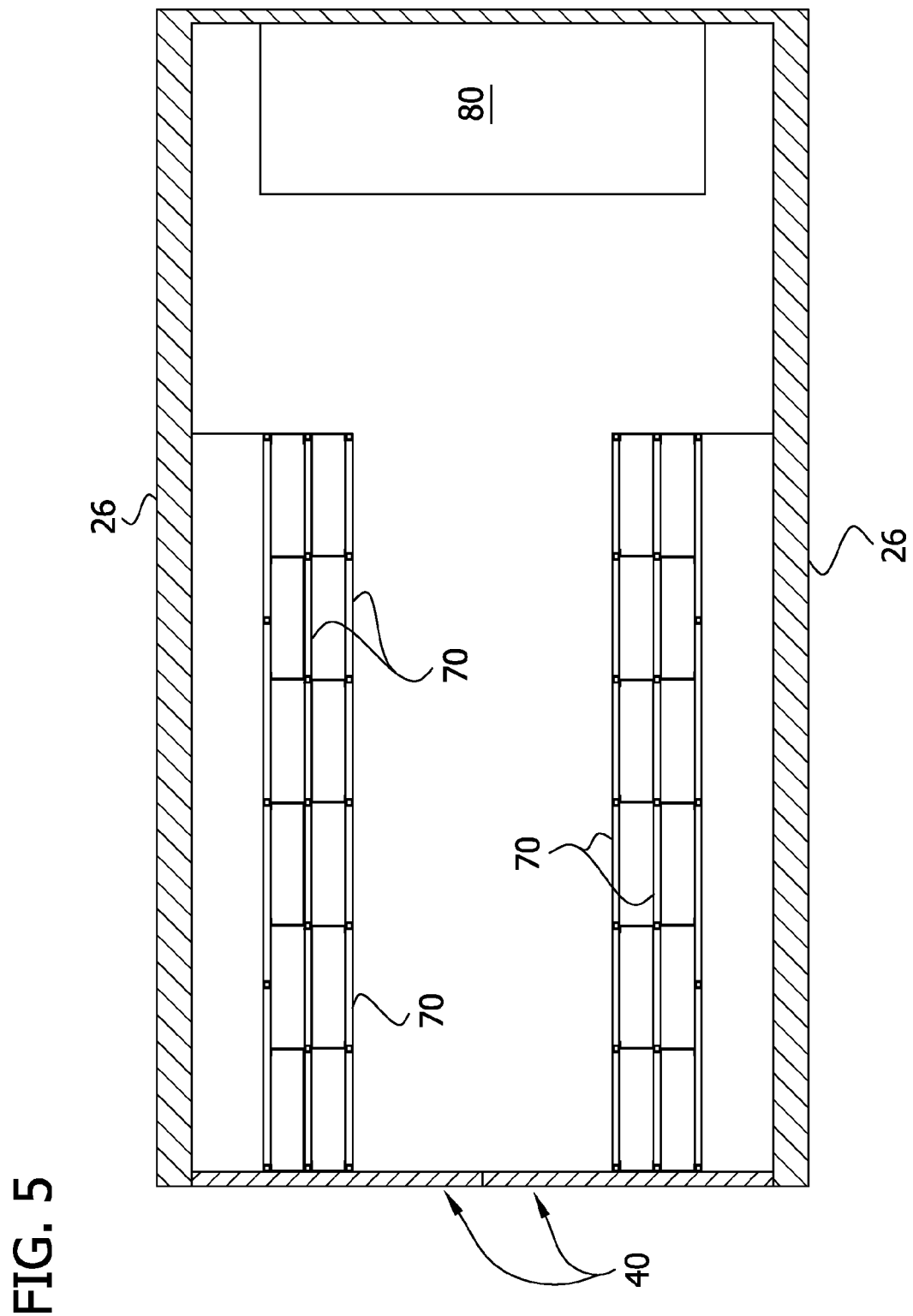
FIG. 5 is cross section of the vehicle taken along line 5-5 of FIG. 3.

As shown in FIG. 5, the body 20 also includes a plurality of vertical storage bins 70. Each of the bins 70 has an open end 72 facing generally toward the top 24 of the body. Further, as illustrated in FIG. 3, each of the storage bins 70 has a longitudinal access extending from the open end 72 toward the bottom 22 of the body 20. The plurality of storage bins 70 are positioned in the interior space 28 beside the ladder compartments 50. Although the storage bins 70 may have other dimensions without departing from the scope of the present invention, in one embodiment each bin is about 6 inches by about 18 inches wide and about 37 inches tall. Further, although there may be other quantities of bins 70 without departing from the scope of the present invention, in one embodiment there are a total of 24 vertical storage bins arranged as shown in FIG. 5.

As illustrated in FIG. 2, the body 20 may also include a work surface 80 mounted adjacent a forward wall 82 of the body. Conventional wheeled storage units 82 may be positioned below the work surface 80 and latches 84 may be provided for retaining the storage units 82 below the work surface 80. Additional storage cabinets and bins 86, 88, respectively, may be provided above the work surface as shown in FIGS. 1 and 2. Further, as shown in FIG. 4, additional storage bins 90 may be positioned between the ladder compartments 50 and the respective pluralities of elongate storage compartments 60. The storage units 82 and the various cabinets and bins 86, 88, 90 in the interior space 28 of the body are suitable for containing the workers tools. Preferably, all the tools carried by the vehicle for use by the worker are contained within the body 20, where they are protected from weather and can be protected by a single conventional locking mechanism (not shown) operable to secure the closure 40 in its closed position.

As will be appreciated by those skilled in the art, the storage compartments and bins identified above may be made by using conventional methods and materials. For example, the storage compartments and bins may be framed by tubular aluminum stock (e.g., 1×1×⅛ inch tube stock) and faced with aluminum sheet (e.g., ⅛ inch sheet), or wood, composite or plastic panels (e.g., 1 inch thick panels). Adhesives, screw fasteners, rivets, and welding may be used in the construction. As will be appreciated by those skilled in the art, hooks (not shown) may be attached to the framing, sheet or panels for hanging equipment (not shown) inside the vehicle body 20.

When completed, the vehicle 10 provides a vehicle in which a ladder may be positioned in a ladder compartment 50 in the body of the vehicle 10. Further, various materials may be sorted by type into storage bins and/or storage compartments in the vehicle 10. Still further, materials may be sorted by size into the storage compartments, including the elongate storage compartments having differing lengths 70, in the body 20 of the vehicle 10. Thus, when a worker uses only a portion of a piece of material, the remaining length of material may be restocked into a shorter storage compartment or bin. In this way stock of differing lengths is sorted and readily identifiable as such when choosing material for later uses.

As will be appreciated by those skilled in the art, the vehicle body 20 of the present invention provides shelter for workers in inclement weather so they can continue to work when they might otherwise stop. Further, the ladders and materials may be secured using a standard lock (not shown) to prevent theft.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A vehicle comprising a chassis, a cab mounted on the chassis, and a body mounted behind the cab, the body comprising:
    a bottom;
    a top opposite the bottom;
    sides extending between the top and bottom, the sides partially enclosing an interior space and defining an opening for accessing said interior space;
    a closure moveable between an open position in which the interior space may be accessed through the opening, and a closed position in which the closure limits access to the interior space; and
    a ladder compartment positioned in the interior space adapted for receiving a ladder having a length of at least about 12 feet, said ladder compartment having a lower surface positioned at a level no more than about 42 inches above ground level, the ladder compartment having an open end facing generally toward said opening, the storage compartment being configured so a ladder can slide be moved longitudinally into and out of the ladder compartment through the open end of the ladder compartment; and
    wherein the body includes a work surface, a wheeled storage unit positionable below said work surface; and
    a latch for retaining said storage unit below said work surface.

2. A vehicle comprising a chassis, a cab mounted on the chassis, and a body mounted behind the cab, the body comprising:
    a bottom;
    a top opposite the bottom;
    sides extending between the top and bottom, the sides partially enclosing an interior space and defining an opening for accessing said interior space;
    a closure moveable between an open position in which the interior space may be accessed through the opening, and a closed position in which the closure limits access to the interior space; and
    a ladder compartment positioned in the interior space adapted for receiving a ladder having a length of at least about 12 feet, said ladder compartment having a lower surface positioned at the bottom of the body, the ladder compartment having an open end facing generally toward said opening, the storage compartment being configured so a ladder can slide be moved longitudinally into and out of the ladder compartment through the open end of the ladder compartment; and
    wherein the body includes a work surface.

3. A vehicle comprising a chassis, a cab mounted on the chassis, and a body mounted behind the cab, the body comprising:
    a bottom;
    a top opposite the bottom;
    sides extending between the top and bottom, the sides partially enclosing an interior space and defining an opening for accessing said interior space;
    a closure moveable between an open position in which the interior space may be accessed through the opening, and a closed position in which the closure limits access to the interior space; and
    a ladder compartment positioned in the interior space adapted for receiving a ladder having a length of at least about 12 feet, said ladder compartment having a lower surface positioned at the bottom of the body, the ladder compartment having an open end facing generally toward said opening, the storage compartment being configured so a ladder can slide be moved longitudinally into and out of the ladder compartment through the open end of the ladder compartment; and
    wherein the body includes a work surface; and
    a wheeled storage unit positionable below said work surface; and
    a latch for retaining said storage unit below said work surface.

* * * * *